(12) United States Patent
Skelton

(10) Patent No.: US 8,129,651 B2
(45) Date of Patent: Mar. 6, 2012

(54) ADAPTER CONVERTING A CONVENTIONAL OXY-FUEL CUTTING TORCH TO AN EXOTHERMIC CUTTING TORCH

(76) Inventor: Glen Thomas Skelton, Fort Calhoun, NE (US)

( * ) Notice: Subject to any disclaimer, the term of this patent is extended or adjusted under 35 U.S.C. 154(b) by 428 days.

(21) Appl. No.: 12/459,555

(22) Filed: Jul. 2, 2009

(65) Prior Publication Data

US 2011/0000888 A1    Jan. 6, 2011

(51) Int. Cl.
*B23K 9/28* (2006.01)
*B23K 9/013* (2006.01)
*B23K 7/00* (2006.01)

(52) U.S. Cl. .......................................... 219/70; 266/48

(58) Field of Classification Search .................. 219/70, 219/74; 266/48, 66, 75; 403/3; 279/2.02, 279/143, 145
See application file for complete search history.

(56) References Cited

U.S. PATENT DOCUMENTS

| 1,028,166 | A | * | 6/1912 | Whitford | 266/66 |
| 2,444,899 | A | * | 7/1948 | Meincke et al. | 266/75 |
| 2,444,900 | A | * | 7/1948 | Meincke et al. | 266/75 |
| 4,142,086 | A | * | 2/1979 | Rotilio | 219/75 |
| 4,461,948 | A | * | 7/1984 | Watts | 219/75 |
| 4,468,007 | A | * | 8/1984 | Dillon | 266/48 |
| 4,496,163 | A | * | 1/1985 | Bernfeld | 279/145 |
| 4,812,610 | A | * | 3/1989 | Moore | 219/70 |
| 5,041,710 | A | * | 8/1991 | Hamal | 219/70 |
| 6,640,679 | B1 | * | 11/2003 | Roberts, Jr. | 279/143 |
| 2003/0047891 | A1 | * | 3/2003 | Tomoni | 279/143 |

* cited by examiner

*Primary Examiner* — Geoffrey S Evans
(74) *Attorney, Agent, or Firm* — Dennis L. Thomte; Thomte Patent Law Office LLC

(57) ABSTRACT

An adapter, and the method of using the same, is disclosed for converting a oxy-fuel cutting torch to an exothermic or air lance cutting torch. The oxy-fuel cutting torch is converted by removing the torch tip therefrom and by substituting a two-piece, adapter which enables one end of a burning bar to be inserted therein and securely positioned therein. Two different embodiments of the adapter are disclosed.

9 Claims, 5 Drawing Sheets

ADAPTER CONVERTING A CONVENTIONAL OXY-FUEL CUTTING TORCH TO AN EXOTHERMIC CUTTING TORCH

BACKGROUND OF THE INVENTION

1. Field of the Invention

This invention relates to an adapter for converting a conventional oxy-fuel cutting torch to an exothermic cutting torch as well as the method of converting the same. More particularly, this invention relates to a two-piece adapter which is substituted for the torch tip of a conventional oxy-fuel cutting torch to enable the adapter to have a burning bar connected thereto.

2. Description of the Related Art

Conventional oxy-fuel cutting torches normally include a handle having valves associated therewith which permit oxygen and fuel to be supplied to a torch tip to enable the torch to cut materials. Exothermic cutting torches employ burning bars to enable the exothermic cutting torches to cut metals, concrete, etc. Thus, separate oxy-fuel cutting torches and exothermic cutting torches are required. One attempt has been previously made to enable a conventional oxy-fuel cutting torch to be converted to an exothermic cutting torch and the same is disclosed in U.S. Pat. No. 4,812,610 which issued on Mar. 14, 1989. Although the adapter disclosed in the '610 patent does apparently enable a burning bar to be supported on the head of the oxy-fuel cutting torch, the adapter disclosed therein is comprised of several pieces or parts which obviously involves considerable expense to manufacture.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The method of this invention enables a conventional oxy-fuel cutting torch to be converted to a torch which can support a burning bar thereon. The oxy-fuel cutting torch includes a head which positions a conventional torch tip by means of a head nut. The method of this invention involves the steps of: (1) threadably removing the head nut from the torch; (2) removing the torch tip from the torch; (3) providing a two-piece adapter including a: first adapter member having inner and outer ends with a central passageway extending therebetween and a second adapter member having inner and outer ends with a central bore extending therethrough; (4) positioning the inner end of the first adapter member adjacent the head of the cutting torch; (5) positioning the second adapter member so that the inner end of the second adapter member embraces the outer end of the first adapter member; (6) loosely threading the head nut on the head whereby the head nut embraces the adapter; (7) inserting one end of the burning bar into the bore of the second adapter so that the end of the burning bar is received by the outer end of the passageway of the first adapter member; (8) threadably tightening the head nut onto the head of the torch to cause the outer end of the first adapter member to securely grip the end of the burning bar therein.

The adapter of this invention includes an elongated first adapter member having inner and outer ends with a central passageway extending therebetween and an elongated second adapter member having inner and outer ends with a central bore extending therebetween. The outer end of the first adapter member defines a collet. The inner end of the first adapter member is positioned adjacent the head of the cutting torch. The second adapter member embraces the outer end of the first adapter member with the outer end of the first adapter member being received in the central passageway of the second adapter member. The outer end of the first adapter member is adapted to have one end of the burning bar inserted within the collet thereof. The head nut is threadably secured to the head and is in engagement with the second adapter member to secure the adapter to the head and to cause the collet to grip the burning bar to secure the burning bar to the adapter.

It is therefore a principal object of the invention to provide a method of converting a conventional oxy-fuel cutting torch to an exothermic cutting torch.

A further object of the invention is to provide an adapter for converting an oxy-fuel cutting torch to an exothermic cutting torch.

A further object of the invention is to provide an adapter which may replace the conventional torch tip of an oxy-fuel cutting torch with the adapter being comprised of two adapter members which enable one end of a burning bar to be supported and secured thereto.

A further object of the invention is to provide a method and means for converting a conventional oxy-fuel cutting torch to an exothermic cutting torch with a minimum number of parts being employed.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
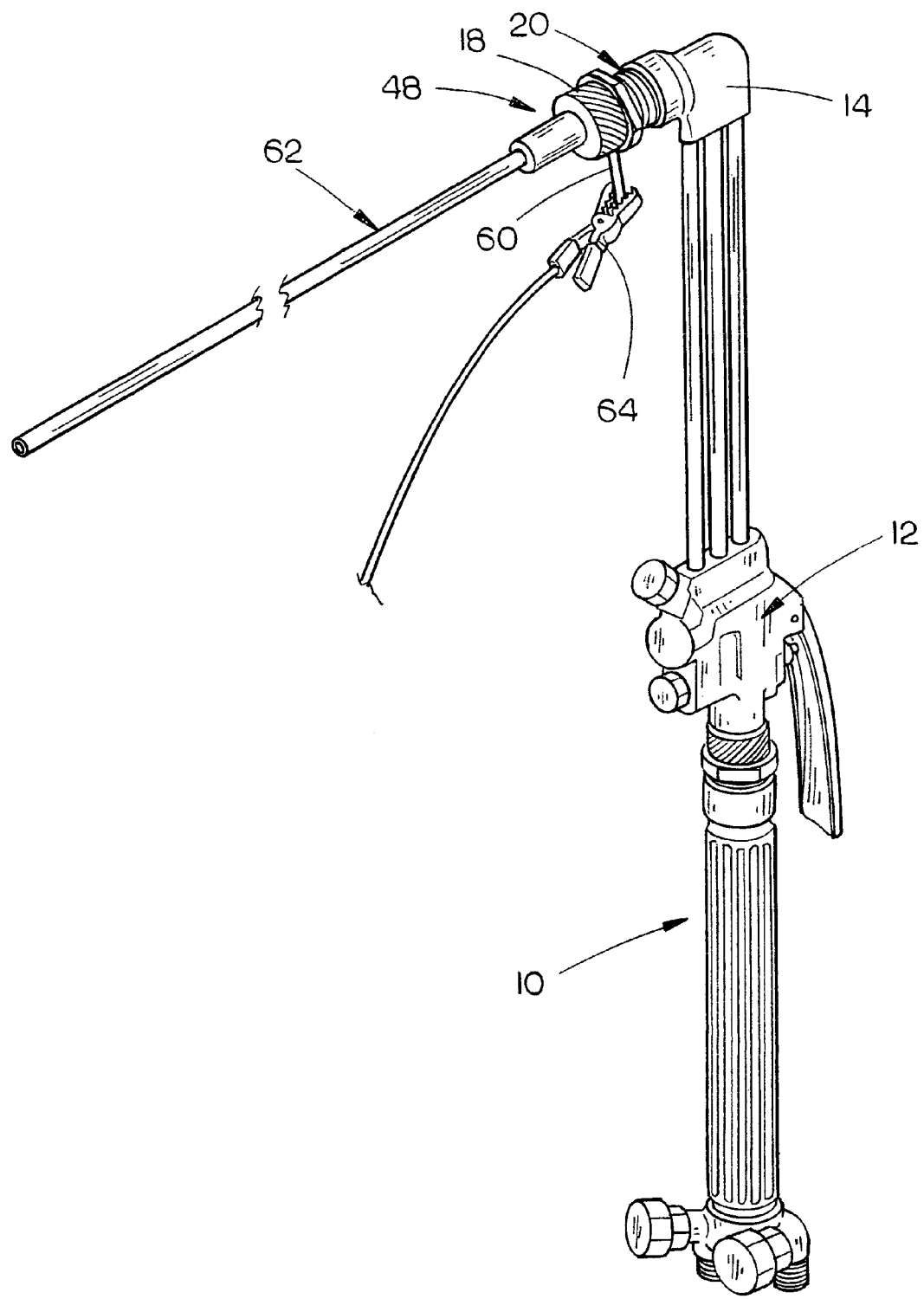
FIG. 1 is a perspective view of a conventional oxy-fuel cutting torch having the adapter of this invention mounted thereon which supports a burning bar therein.
Figure 2:
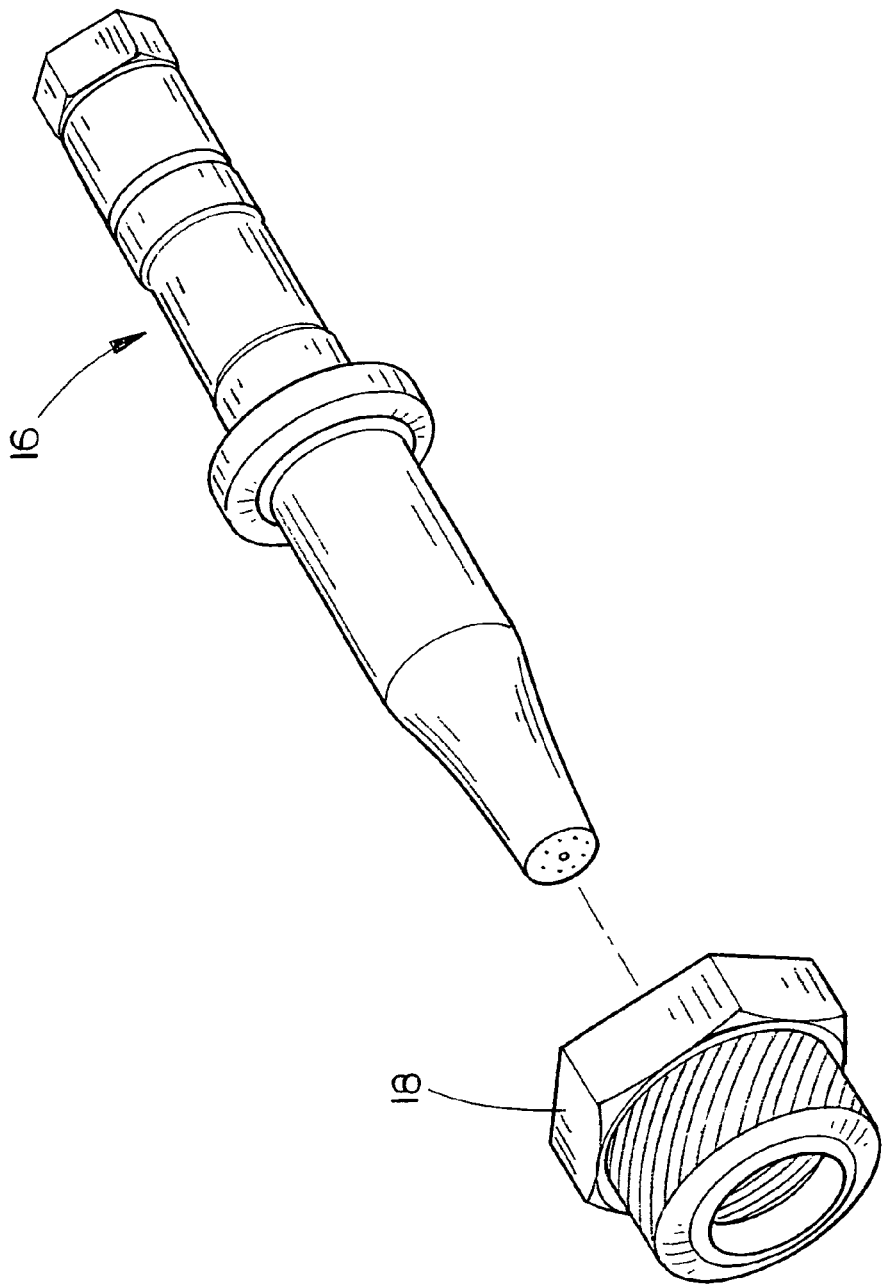
FIG. 2 is a partial perspective view of a conventional torch tip and the head nut which secures the torch tip to the head of the conventional oxy-fuel cutting torch.

The numeral 10 refers to a conventional oxy-fuel cutting torch which includes a body portion 12, head 14, torch tip 16 and head nut 18. In FIG. 1, the torch 10 has had the torch tip 16 removed therefrom to enable the adapter 20 of this invention to be utilized to convert the torch 10 to an exothermic cutting torch or air lance. FIG. 2 illustrates one form of a torch tip 16 which is secured to the head 14 by the head nut 18.

Figure 5:
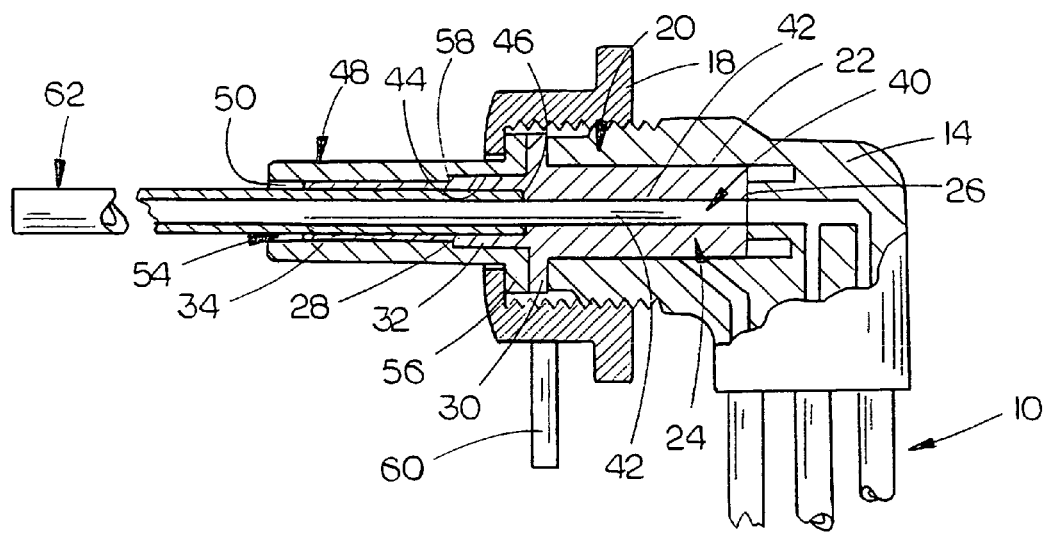
FIG. 5 is a sectional view of the adapter of FIG. 3 mounted on the head of a conventional oxy-fuel cutting torch.
Figure 6:
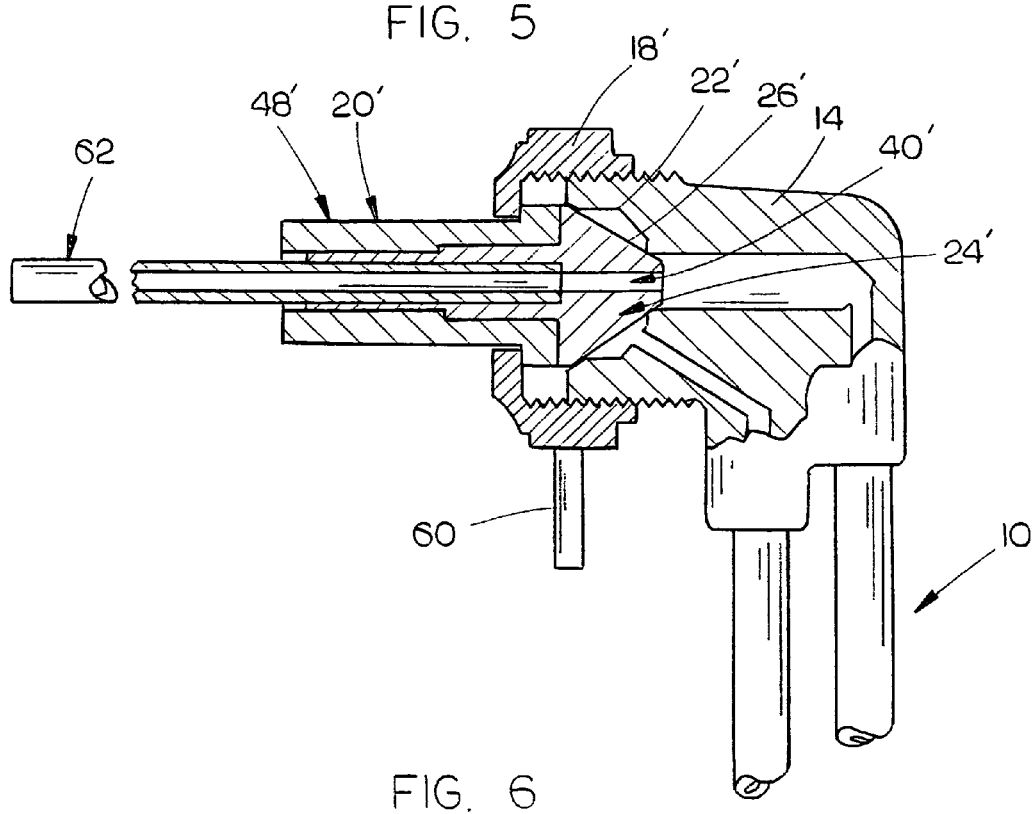
FIG. 6 is a sectional view illustrating the adapter of FIG. 4 secured to the head of the conventional oxy-fuel cutting torch.

In FIG. 5, one form of a conventional oxy-fuel cutting torch is illustrated which includes a cylindrical bore 22 formed therein to receive one end of the torch tip 16. In FIG. 6, another form of a conventional torch 10 is illustrated which does not have the cylindrical bore 22 formed in the head therein but which has a tapered bore 22' formed therein adapted to receive the frusto-conical shaped end of a torch tip. In the drawings, the numeral 20 refers to the adapter which is used with the torch of FIG. 5 while the numeral 20' refers to the adapter which is used with the torch of FIG. 6. There are many different types of torches to which the adapter of this invention may be utilized with the primary differences between the adapters being in the shape of the inner end thereof.

Figure 3:
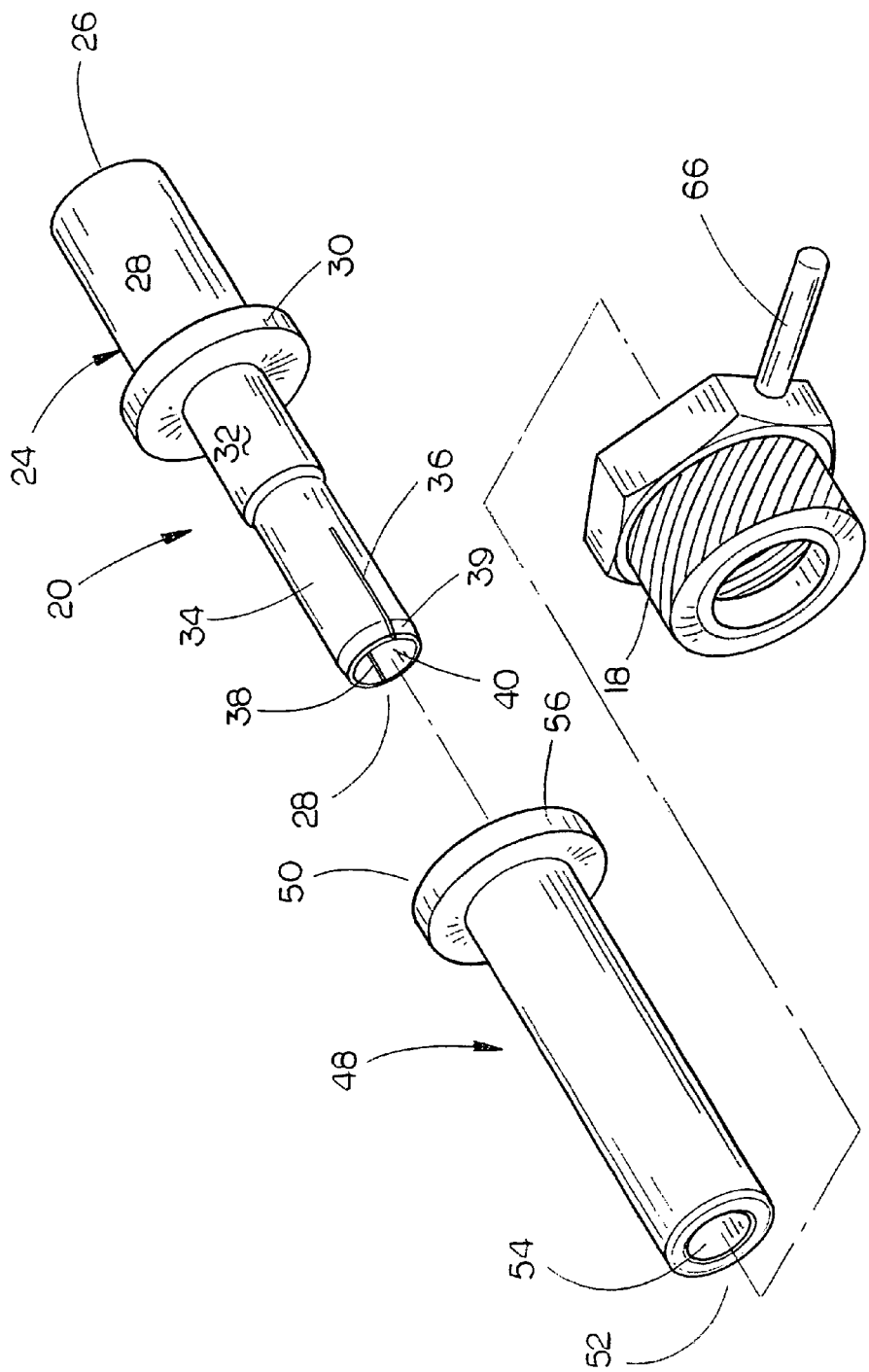
FIG. 3 is an exploded perspective view of one form of the adapter of this invention.

As seen in FIG. 3, adapter 20 includes a first elongated adapter member 24 having an inner end 26 and an outer end 28. For purposes of description, adapter member 24 will be described as having an enlarged cylindrical portion 28 at its inner end, a shoulder or flange 30 at the outer end of cylindrical portion 28, a cylindrical portion 32 extending outwardly from shoulder 30 and a collet portion 34 having slits 36 and 38 formed therein. Collet portion 34 has a beveled inner end portion 39 formed thereon. Adapter member 24 has an elongated passageway or bore 40 extending therethrough between its inner and outer ends defined by bore portions 42 and 44 having a shoulder 46 therebetween, as seen in FIG. 5.

Adapter 20 also includes a second elongated adapter member 48 having an inner end 50 and an outer end 52 with bore 54 extending therebetween. Adapter member 48 has a shoulder or flange 56 extending laterally therefrom at the inner end thereof. Bore 54 has a shoulder 58 formed therein as seen in FIG. 5.

Normally, the adapter 20 may be used with the existing head nut 18 or a new head nut 18 may be used. Preferably, an elongated rod-like handle 60 is secured to the head nut 18 and extends outwardly therefrom to provide a conventional means to tighten or loosen the head nut 18.

Figure 4:
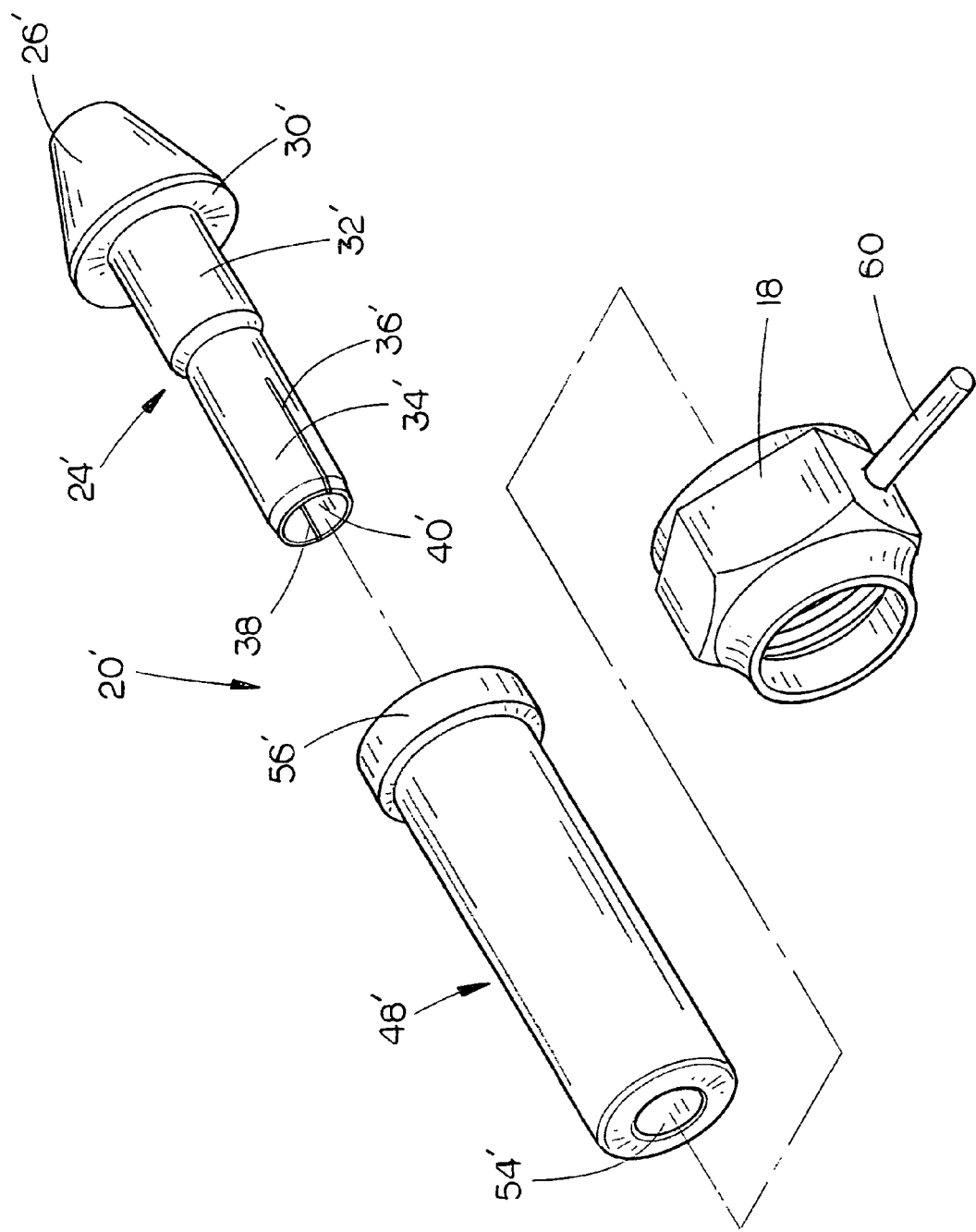
FIG. 4 is an exploded perspective view of another embodiment of the adapter of this invention.

Adapter 20' shown in FIGS. 4 and 6 is essentially identical to adapter 20 and includes adapter members 24' and 48'. The primary difference between adapters 20 and 20' is that adapter member 24' has a truncated conical shaped inner end 26' rather than the cylindrical body portion 28 of adapter 20. The outer end of the truncated conical shaped inner end 26' defines a shoulder 30'. The flange 56' on adapter member 48' has a somewhat smaller diameter than flange 56. Further, the diameter of adapter member 48' is somewhat greater than the diameter of adapter member 48. The similar structure on 20' will be designated by "'".

The numeral 62 refers to a conventional burning bar while the numeral 64 refers to an electrically conductive alligator clamp operatively connected to a source of 12V power.

Assuming that the torch 10 is of the type illustrated in FIG. 5, the torch is converted as follows: first, the conventional head nut 18 is removed from the head 14 of the torch 10 so that the torch tip therein may be removed. The inner end of the adapter member 24 is then inserted into the bore 22 of head 14. A burning bar 62 is then inserted through the bore 54 of adapter member 48 and the adapter member 48 is slidably inserted onto the outer end of adapter member 24. The head nut 66 is then slipped over the cutting bar 62, and adapter 20 if not already so positioned with the head nut 18 then being threadably tightened onto the head 14 with the collet portion 34 being moved inwardly into engagement with the inner end of the burning bar 62 to securely mount the inner end of the burning bar 62 in the adapter 20.

In use, the source of the electrical energy may be connected to either the burning bar 62 or to the handle 60. The handle 60 enables the head nut 18 to be securely secured to the head 14 to maintain the burning bar 62 in the adapter.

The adapter 20' functions in the same manner as that of the adapter 20 with the only difference being in the configuration in the inner end of the adapter member 24'.

Thus it can be seen that a novel adapter has been provided to convert a conventional oxy-fuel cutting torch to an exothermic cutting torch or air lance with a two-piece adapter replacing the conventional torch tip of the cutting torch. It can also be seen that the method of converting the conventional oxy-fuel cutting torch to an exothermic cutting torch or air lance has also been provided. The method and means of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. The method of converting an oxy-fuel cutting torch having a head which positions a torch tip by means of a head nut, comprising the steps of:
   threadably removing the head nut from the torch;
   removing the torch tip from the torch;
   providing a two-piece adapter including: a first adapter member having inner and outer ends with a central passageway extending therebetween; and a second adapter member having inner and outer ends with a central bore extending therebetween;
   positioning the inner end of the first adapter member adjacent the head of the cutting torch;
   positioning the second adapter member with respect to the first adapter member so that the inner end of the second adapter member embraces the outer end of the first adapter member;
   loosely threading the head nut on the head whereby the head nut embraces the adapter;
   inserting one end of a burning bar into the bore of the second adapter so that the end of the burning bar is received by the outer end of the passageway of the first adapter member;
   threadably tightening the head nut onto the head of the torch to cause the outer end of the first adapter member to securely grip the end of the burning bar therein.

2. The method of claim 1 further comprising the step of providing abutting shoulders on the first and second adapter members.

3. The method of claim 1 further comprising the step of providing a collet on the second end of the first adapter member.

4. The method of claim 1 further comprising the step of providing an elongated handle on the head nut which extends outwardly therefrom.

5. In combination with an oxy-fuel cutting torch having a head which positions a torch tip by means of a head nut, comprising:
   an adapter which is substituted for the torch tip;
   said adapter including an elongated first adapter member having inner and outer ends with a central passageway extending therebetween and an elongated second adapter member having inner and outer ends with a central bore extending therebetween;

said outer end of said first adapter member defining a collet;

said inner end of said first adapter member being positioned adjacent the head of the cutting torch;

said second adapter member embracing said outer end of said first adapter member with said outer end of said first adapter member being received in said central passageway of said second adapter member;

said outer end of said first adapter member adapted to have one end of a burning bar inserted within the collet thereof;

said head nut threadably secured to the head and being in engagement with said second adapter to secure said adapter to the head and to cause said collet to grip the burning bar to secure the burning bar to the adapter.

6. The combination of claim 5 wherein said first and second adapters have abutting shoulders thereon.

7. The combination of claim 6 wherein said head nut engages said shoulder on said second adapter member.

8. The combination of claim 5 wherein said head nut has an elongated handle secured thereto which extends laterally therefrom.

9. The combination of claim 8 wherein said handle is electrically conductive.

* * * * *